Figure 1:
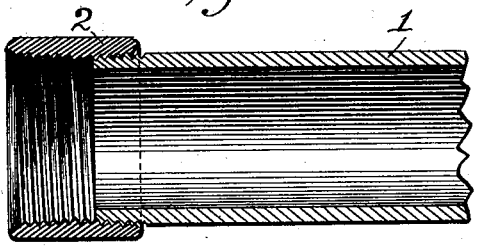

(No Model.)

W. S. McMANUS & J. A. HOCK.
METHOD OF SCREWING SOCKETS UPON PIPES.

No. 506,531. Patented Oct. 10, 1893.

Witnesses:
Percy B. Hills
A. M. Parkins

Inventors,
William S. McManus,
John A. Hock,
by Pennie & Goldsborough
attys

UNITED STATES PATENT OFFICE.

WILLIAM S. McMANUS AND JOHN A. HOCK, OF SOUTH CHESTER, PENNSYLVANIA.

METHOD OF SCREWING SOCKETS UPON PIPES.

SPECIFICATION forming part of Letters Patent No. 506,531, dated October 10, 1893.

Application filed September 13, 1892. Serial No. 445,763. (No model.)

*To all whom it may concern:*

Be it known that we, WILLIAM S. McMANUS and JOHN A. HOCK, citizens of the United States, residing at South Chester, in the county of Delaware and State of Pennsylvania, have invented certain new and useful Improvements in Methods of Screwing Sockets Upon Pipes; and we do hereby declare the following to be a full, clear, and exact description of the invention, such as will enable others skilled in the art to which it appertains to make and use the same.

Our invention relates to an improved method of screwing knuckles, collars, sockets, couplings, and the like, upon the ends of threaded pipes. Heretofore this operation has generally been performed by screwing the socket or collar upon the end of the pipe, as far as it would go, by hand, after which it was necessary to grasp it exteriorly with a pipe wrench or tongs in order to further turn the socket and complete the operation, or to hold the socket or collar stationary while the pipe itself was being revolved, as is the usual practice at pipe mills. It will, of course, be understood that the socket or the pipe, or both are tapered at their screw-thread surfaces, so as to form a tight joint when the socket is forced home upon the pipe. This method is, however, objectionable, owing to the fact that the crushing action of the wrench or tongs upon the socket tightly clamped in its jaws tends to flatten the walls and destroy the cylindrical contour of the interior of the socket, so that the threaded exterior of the pipe conforms but partly to the altered form of the socket, thereby producing an imperfect fit and a defective joint which leaks under pressure. To overcome this difficulty, it is customary to strengthen the walls of sockets and collars intended for piping, when safety requires absolutely perfect joints, by increasing the thickness of the walls of the socket until they are sufficiently strengthened to prevent the tongs from throwing the socket out of cylindrical contour. But these extra heavy sockets, besides involving a waste of metal, are only effective under conditions impossible to uniformly realize in practice, to wit, when the pipe thread is cut absolutely according to the standard contemplated. Where there is the slightest variation in the pipe thread, (for instance, where, by reason of dullness of the thread cutting die, the thread is cut too large or full) the rigidity of the socket tends to crush the threads during the screwing-up operation, and thus causes a defective joint. By the practice of our improved method these objections are entirely obviated, and perfect joints can be made with sockets of even thinner and lighter material than is now commonly used.

Figure 2:
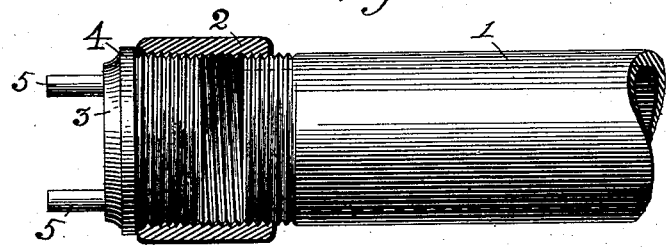
Figure 3:
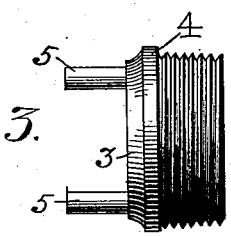
Figure 4:
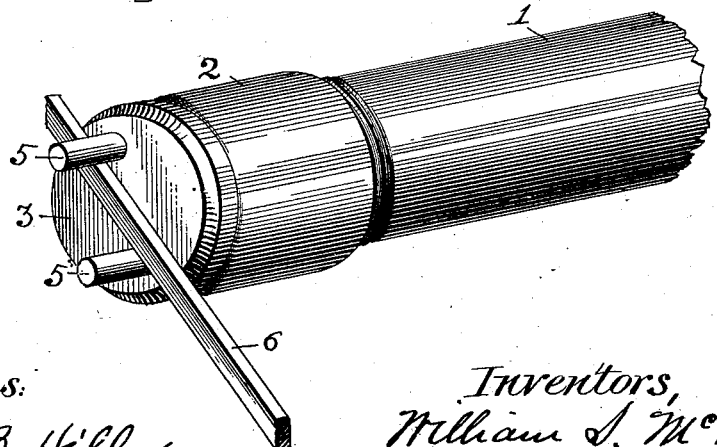

In the accompanying drawings, forming part of this specification, Figure 1 is a sectional view of a fragment of an ordinary gas pipe with a threaded collar screwed on its end. Fig. 2 is a side view of the same with the screw-plug used in the practice of our invention seated in the socket. Fig. 3 is a side view of the plug detached; and Fig. 4 is a perspective view of the parts shown in Fig. 2, showing the method of using the plug.

Similar numerals indicate corresponding parts in the several views.

Referring to the drawings, 1 denotes a fragment of an ordinary gas or water pipe, and 2 the usual socket or collar forming the joint between two sections of piping.

The numeral 3 indicates the threaded plug we employ, adapted to be screwed into the end of the socket, as represented in Fig. 2. This plug may be formed solid or hollow, as preferred, and for convenience of insertion in the mouth of the socket should preferably be slightly tapered, as illustrated in Fig. 3.

The numeral 4 denotes a rim flange or shoulder on the head of the plug, projecting beyond the thread of the screw. This flange forms a stop or abutment for the end of the socket, limiting the movement of the plug and preventing the same from becoming set in the socket so as to be difficult of removal.

Projecting from the face of the plug are plain studs, pins or other projections 5, the object of these studs being to receive a handle or lever for the purpose of turning the plug to screw the socket on the pipe or of holding the socket while the pipe is being screwed into it. These projections are preferably arranged at diametrically opposite points, though this is not essential. The numeral 6 denotes an ordinary rod or bar, forming, when in place, such a handle. It is adjusted between the pins, as shown in Fig. 4, and may be of any suitable length to secure the required leverage.

Instead of the pins or studs shown in the drawings, the head of the plug may be provided with any other means for the temporary connection of a wrench or handle therewith; as, for example, the head may be squared, like a nut, to receive a wrench, or depressions may be formed in it, instead of projecting pins or studs, as herein shown.

It is preferable to provide the plug with means for detachably connecting the handle therewith, so that a common rod or bar may be used for the handle, as represented in the accompanying drawings. It may, however, be furnished with a permanent handle, crank or lever; as any sort of means for turning the plug after it has been started or of holding the plug while the pipe is being screwed into the socket is within the contemplation of the invention.

The manner of practicing our invention will be readily understood from the drawings. We start the socket on the pipe by hand. The plug is then inserted and screwed up to its seat in the socket, when, by the use of the lever handle, it may be held stationary while the pipe is being screwed into the socket or may be itself turned, carrying the socket with it, until the socket has been screwed upon the pipe as far as desired to complete the joint. By the expression "turning the screw plug and pipe relatively to each other," as employed in the claim, we intend to cover the operation generically, i. e. whether the screw plug is turned while the pipe is held stationary, or whether the pipe is turned while the screw plug is held stationary, or finally, whether both be turned simultaneously in opposite directions; it being evident that these are all equivalents of each other.

By the expression "said parts having as to each other a gain taper," as employed in the claim, we intend to cover all cases in which the co-operating threads of the parts, when the socket is forced home upon the pipe, shall be wedged into close contact with each other, and it is obvious that the taper of the screw thread may be made upon either the socket, pipe end, or both, as the case may be.

It is noted that, by our method, sockets, collars, and the like, may be turned to place on threaded pipes and tubes without clamping them in tongs or wrenches, and without the application of any other external force or pressure tending to flatten or distort the true cylindrical contour of the threaded interior.

Having thus described our invention, what we claim is—

The method of forcing home a threaded socket upon the threaded end of the pipe, said parts having as to each other a gain taper, which consists in inserting within one end of said socket a supporting screw plug, limiting the distance to which said screw plug shall enter the socket, and then turning the screw plug and pipe relatively to each other to forcibly seat the parts on each other; substantially as described.

In testimony whereof we affix our signatures in presence of two witnesses.

WILLIAM S. McMANUS.
JOHN A. HOCK.

Witnesses:
G. MERRITT STROUD,
L. A. TUCKER.